Aug. 20, 1963 P. J. DAVIS 3,100,992
MEANS FOR PREPARING MATTRESS PROFILE CHART
Filed Sept. 15, 1960 3 Sheets-Sheet 1

INVENTOR
PERRY J. DAVIS
BY Herbert Q. Neintern
ATTORNEY

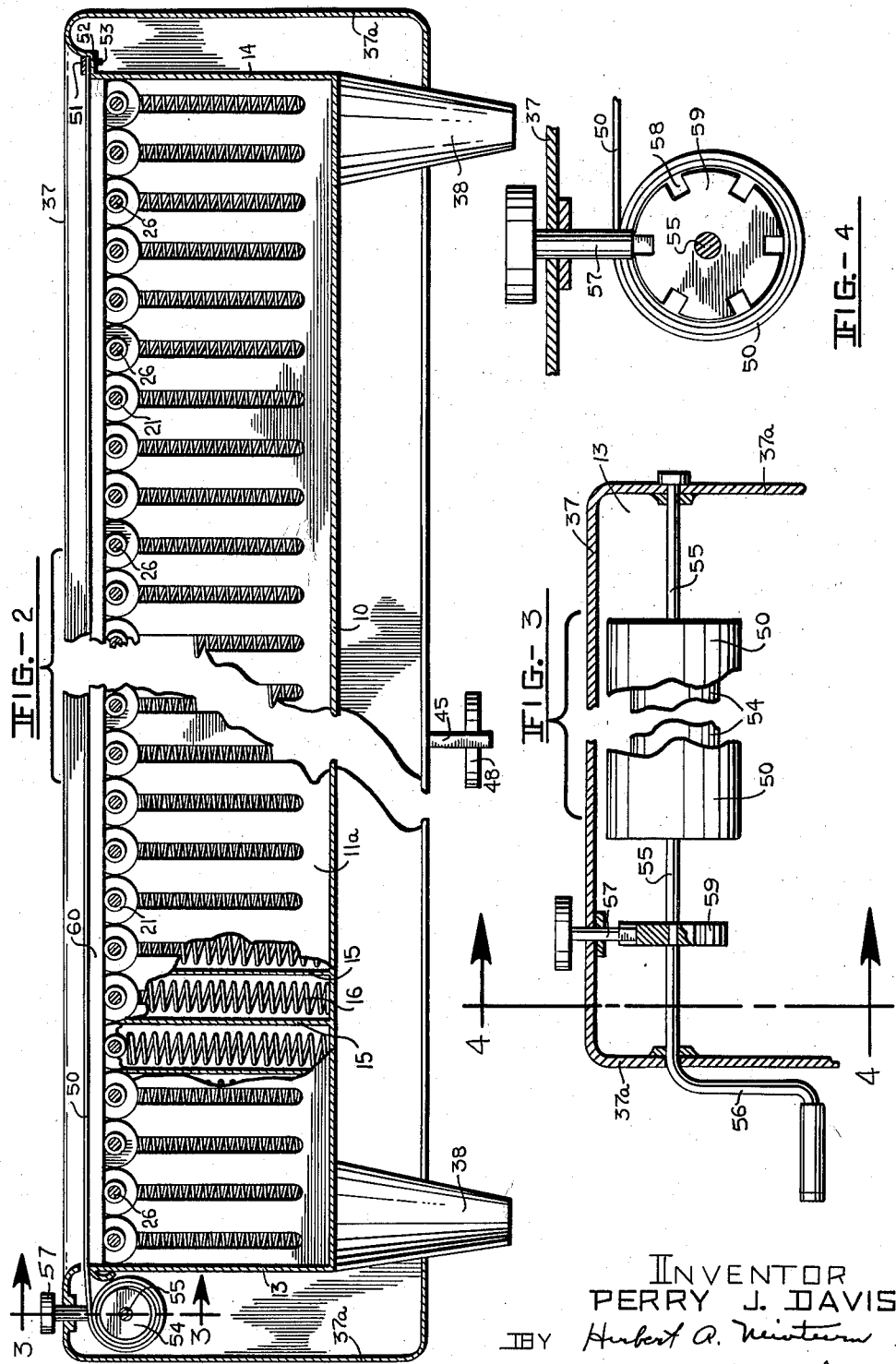

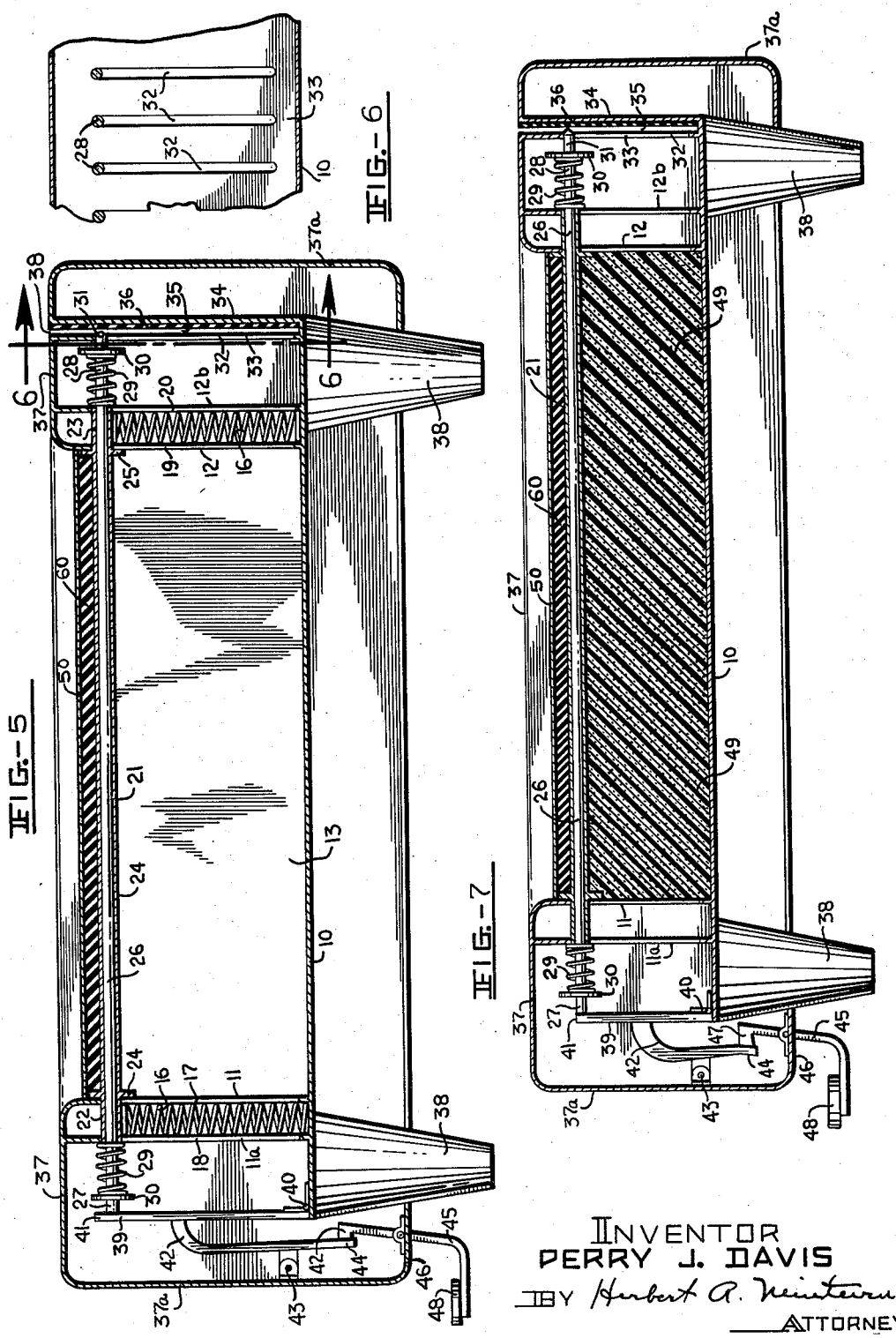

United States Patent Office 3,100,992
Patented Aug. 20, 1963

3,100,992
MEANS FOR PREPARING MATTRESS
PROFILE CHART
Perry J. Davis, R.R. 2, near Noblesville, Ind.
Filed Sept. 15, 1960, Ser. No. 56,274
11 Claims. (Cl. 73—172)

This invention relates to a device upon which a person may lie and permit the charting of the distribution of the weight of that person for the purpose of indicating a particular design of a mattress which would be most suitable and most comfortable for that particular person.

A primary object of the invention is to provide such means which will permit the recording of that weight distribution in permanent form in the nature of a chart.

A further primary object of the invention is to provide such means in an extremely simple form in the absence of electrical contacts and circuits and also in the absence of displacements of fluids.

A still further important object of the invention is to provide such means in a form which may be produced at a relatively low cost of manufacture and which will remain reliable over long periods of time.

These and many other objects and advantages of the invention will become apparent to those versed in the art in the following description of one particular form of the device as illustrated in the accompanying drawings, in which FIG. 1 is a fragmentary top plan view of a structure embodying the invention and in partial section;

FIG. 2 is a view in longitudinal section on the line 2—2 in FIG. 1;

FIG. 3 is a view in vertical transverse section on the line 3—3 in FIG. 2;

FIG. 4 is a vertical longitudinal section on the line 4—4 in FIG. 3;

FIG. 5 is a view in transverse vertical section on the line 5—5 in FIG. 1;

FIG. 6 is a detail in vertical section on the line 6—6 in FIG. 5; and

FIG. 7 is a view in transverse vertical section of a modified form of the device.

Figure 1:
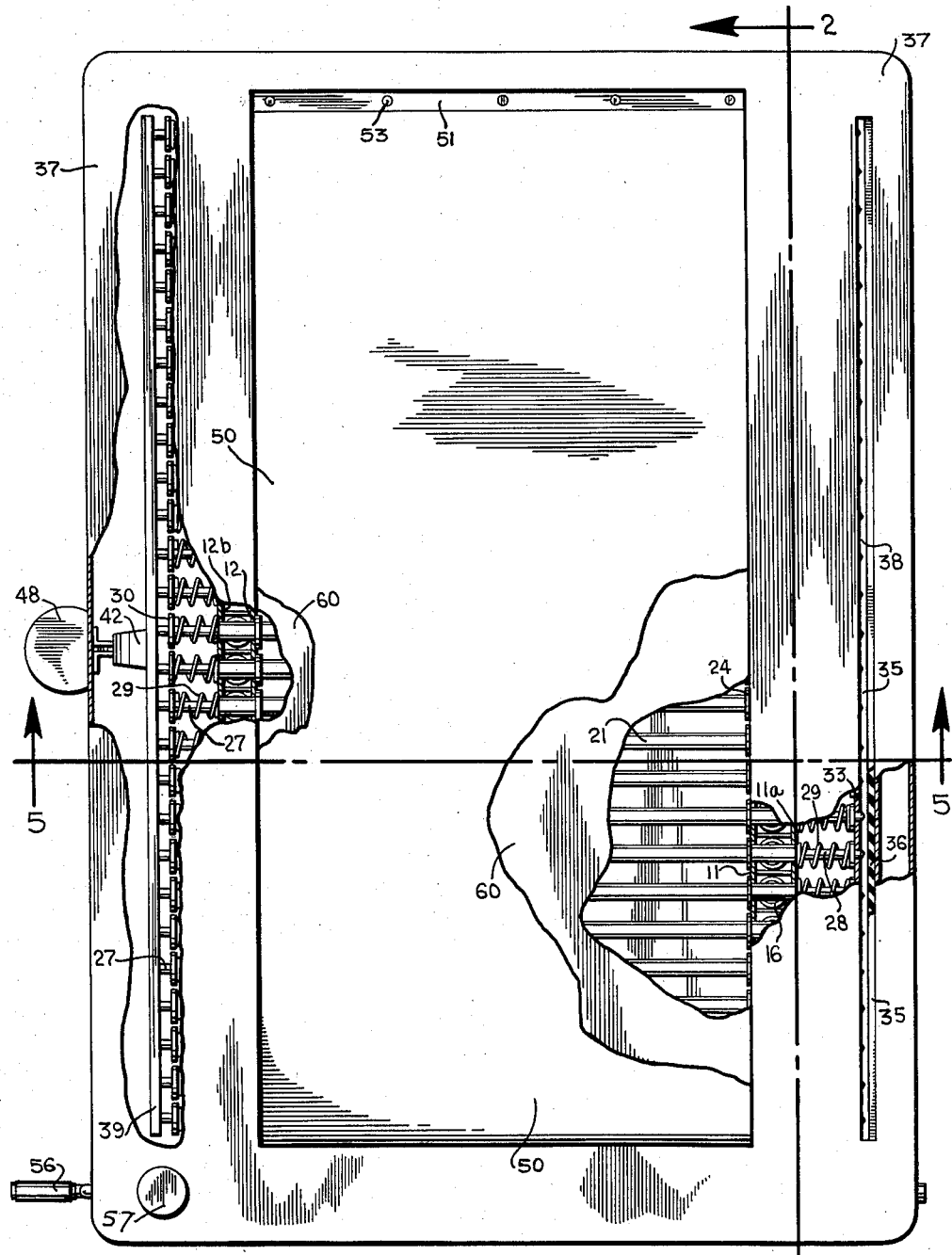

There is a foundation structure comprising a floor 10, from which extends vertically side walls 11 and 12, and end walls 13 and 14. There are auxiliary walls 11a and 12b spaced outwardly respectively from the inner walls 11 and 12, FIGS. 5 and 7. Between the walls 11, 11a and 12, 12b, are a plurality of partitions 15 spaced regularly apart one from the other. Between each adjacent pairs of partitions 15, there is placed a coil spring 16 resting by a lower end on the floor 10.

The walls 11, 11a and 12, 12b are vertically slotted centrally between adjacent partitions 15, these slots being designated respectively by the numerals 17, 18 and 19, 20. A tube 21 extends transversely through the walls 11, 11a and 12, 12b with end portions 22 and 23 extending through the slots 17, 18 and 19, 20 respectively to have the spring 16 yieldingly urge the tube 21 in each instance to the upper limits of the slots. The tube 21 in each instance carries a collar 24 and a collar 25 fixed thereto to slidingly bear against the opposing faces of the walls 11 and 12 so as to prevent longitudinal displacement of the tubes 21 as they may be pushed downwardly between those walls 11 and 12 and returned by the spring 16.

Each tube 21 carries a rod 26 longitudinally slidable therein. The rod 26 in each instance normally extends from each end of the tube 21 by end portions 27 and 28 projecting beyond the walls 11a and 12b respectively. Each of these ends 27 and 28 carries a coil spring 29 therearound to bear by one end against the end of the tube 21 and by the other end against a collar 30 fixed to the respective rod ends. In this manner, the rod 26 in each instance is retained to have approximately equal lengths 27 and 28 extending beyond the walls 11a and 12b, permitting the rod 26 to be moved longitudinally of the tube 21 yieldingly against the opposition of a spring 29 depending upon which direction the tube 21 is pushed.

One of the ends of the rod 26 in each instance is pointed preferably as at 31 on the rod end 28 in the present showing. This pointed end 31 is received through a slot 32 in each instance vertically disposed in alignment with vertical travel of the rod end 31 in a wall 33 which extends upwardly from the floor 10.

The pointed ends 31 of the rods 26 are directed toward a back-up wall 34 extending vertically from the floor 10 in spaced relation from the wall 33. Within the spacings 35 between these walls 33 and 34, there is placed a resilient pad 36 extending throughout the longitudinal length of the walls 33 and 34, and is preferably bonded to the wall 34 so as to stand erect as is shown in FIGS. 5 and 7. The spacing apart of the walls 33 and 34 is such that with the rods 26 retained in their normal state of equilibrium between the tensioning of the springs 29, there is sufficient space left to permit the insertion of a tape throughout the height and length of this spacing 35 between the ends 31 of the rods and the pad 36.

This tape may be made of paper (not shown) so that it may be perforated by the pointed ends 31 of the rods 26 upon the rods being moved against that tape backed up by the pad 36.

The upper ends of the walls 11, 11a, 12, 12b, 13 and 14 are tied together by a top member 37 through which there is a slot opening 38. FIG. 5, over the spacing 35 so that the tape may be inserted therethrough into that spacing.

This top member 37 is carried around and downwardly on respective sides and ends of the device spaced outwardly from the walls 11a, 34, and 13 and 14 in the nature of an apron, this apron being designated by the numeral 37a. The floor 10 is supported in any suitable manner, herein shown as by the legs 38.

At one side of the device, herein shown as between the wall 11a and the apron 37a there is carried a device for shifting the rods 26 within their tubes 21. This device consists essentially of a bar 39 which extends the entire length of the device, being hinged to the floor 10 as at 40, and having an upper portion between the hinge 40 and the top bar end 41 to be within the paths of the ends of the rods 26, the ends 27, so that by pushing the bar 39 to the right as indicated in FIGS. 5 and 7, all of the rods 26 may simultaneously be longitudinally shifted in their tubes 21 to the right and cause the pointed ends 31 to enter and travel across the passageway 35 on the other side. Any suitable means may be employed to rock the bar 39 against the rod ends 27, one particular means being illustrated herein as comprising a lever 42 hingedly supported from the inside of the apron 37 on the pivot 43 to extend downwardly therefrom by an end portion 44. The upper end of the lever 42 is in the path of the bar 39, FIGS. 5 and 7. A second lever 45 is hingedly supported on a flange 46 of the apron 37a to have an upper end portion 47 rest against the lower end 44 of the lever 42, and a lower end of the lever 45 carries a pedal 48 so that by stepping on the pedal 48, the lever 45 may be rocked to in turn rock the lever 42 and cause the bar 39 to bear against the rod ends 27 and carry them simultaneously to the right to cause the pointed ends 31 to traverse the passageway 35.

While it has been indicated above that springs 16 may be employed at the opposite ends of the tubes 21 as means for resiliently retaining those tubes 21 in upper-most positions, other resilient means may be employed such as is indicated in FIG. 7, wherein a block of rubber or a synthetic rubber material 49 may be carried on the floor 10 to bear elastically upwardly therefrom against the tubes 21 to supply the yielding, resilient means permitting the tubes 21 to be pushed downwardly under pressure against that block 49. In the use of this material 49, the springs 16 may be omitted.

A sheet 50 of such material as sail cloth or ducking is anchored at one end to the member 37 by any suitable means, herein shown as by being clamped between a bar 51 and a ledge 52 of the top member 37 such as by rivets 53 therethrough. This material 50 is carried across all of the tubes 21 and is wrapped by its other end around a roller 54 which is fixed on a shaft 55 in turn rotatably mounted between opposite sides of the apron 37 between that apron 37a and the wall 13, FIG. 2. On one end of the shaft 55 there is provided a crank 56 by means of which the roller 54 may be rotated so as to wind the material 50 therearound into a taut condition. The tautness is maintained in any suitable manner, herein shown as by a pin 57 freely dropping down through the top member 37 to come into notches 58 provided on a wheel 59 fixed on one end portion of the shaft 55. Preferably there is provided some resilient means between the topsides of the tubes 21 and the underside of the material 50. This resilient means designated by the numeral 60 may be either attached directly to the underside of the material 50, or may be a free pad as indicated in the drawings.

Operation

In using the structure above described, the customer for a mattress will lie down upon the cover 50 which has been previously pulled into a taut condition so that the customer may be free to move about and lie transversely of the tubes 21. Once the customer is substantially centered between the sides of the device, that is between the walls 11 and 12, the tautness of the material 50 is relieved by turning the crank 56 slightly to a tauter condition of the material 50 and lifting the pin 57 to permit the material to be released from the pull around the roller 59 so that all of the weight of the customer is then taken and supported by the tubes 21.

Depending upon the weight distribution of the customer, some of the tubes 21 will be pushed downwardly farther than will other tubes so that a line drawn across the topsides of the rods will define a curve indicating by its vertical undulations the relative weight distributions of the customer. With the customer lying still, the foot pedal 48 is depressed to cause the rods 26 to travel longitudinally through the tubes 21 and have the ends 31 bear against and perforate the tape which has been positioned in the passageway 35, this perforation being easily accomplished by the reason of the pointed ends 31 being backed up on the opposite side of the tape by the rubber-like material 36.

Thereupon, the material 50 is pulled up tautly by winding it around the roller 54 and the pin 57 dropped to retain that tautness so that the customer may easily remove himself from the device. Release of the pedal 48 will permit the springs 29 to come into action, the springs 29 particularly on the ends 27 returning the rods 26 to their normal positions. The tape may then be withdrawn from the passageway 35 and studied. The undulations in the line of punchings in the tape will indicate how the mattress should be constructed for this particular customer in respect to his weight distribution.

Therefore it is to be seen that I have produced an exceedingly simple device with relatively few moving parts which may be caused to give the desired variable indications suitable for translating into a mattress construction. While I have shown the device in the one particular form as described in more or less minute detail, it is obvious that structural variations may be employed without departing from the spirit of the invention, and I therefore do not desire to be limited to that precise form beyond the limitations which may be imposed by the following claims.

I claim:

1. In a device for indicating weight distribution of a person for determining a mattress construction; a plurality of parallel, aligned horizontally disposed tubes; resilient means supporting said tubes; a rod longitudinally slidably carried in each of said tubes; a vertical back-up wall across common ends of said rods; means engaging said rods for shifting them in said tubes toward said back-up wall; and means carried by said back-up wall engaging said rods when said rods are shifted toward the back-up wall for recording positions of said tubes.

2. The structure of claim 1 in which there is a cover extending across top sides of said tubes, and means for tensioning said cover.

3. The structure of claim 1 in which there are opposing walls having vertically disposed, spaced apart slots, through which slots, respective ends of said tubes extend and are guided in up and down travel thereof.

4. The structure of claim 1 in which there is resilient means normally retaining said rods approximately centrally disposed in respect to said tubes.

5. The structure of claim 1 in which said rod engaging means comprises a member simultaneously contacting said rod ends when in various positions of elevation as determined by the weight of said person on each of said tubes, and there is means for moving said member for simultaneous shifting of said rods.

6. The structure of claim 3 in which said resilient means consists of a spring at each end of each of said tubes.

7. The structure of claim 3 in which said resilient means comprises a block of rubber-like material under said tubes.

8. In a device for indicating weight distribution in accordance with the height of a person, a pair of opposing side walls each having aligned vertical slots therethrough; a tube extending from wall to wall through said slots; stops on said tubes restraining said tubes from longitudinal travel through said slots; a rod slidably carried through each of said tubes and of longer length than that of the tubes; resilient means normally holding said rods against travel through said tubes; a back-up wall across and normally spaced from common ends of said rods, toward which back-up wall ends of the rods are directed; means resiliently supporting said tubes urging them toward the upper ends of said slots; means contacting said rods throughout the range of vertical travel thereof with said tubes for urging said rods in longitudinal travel toward said back-up wall in opposition to said resilient rod holding means; and a recording member across said back-up wall engaged by said rod common ends upon said rod longitudinal travel in each instance.

9. The structure of claim 8 in which there is a tube top-side cover member and there is means selectively tensioning said cover member.

10. The structure of claim 8, in which there is a wall spaced from and on the outer side of each of said slotted walls, said last walls being also slotted to receive ends of said tubes therethrough; and said tube resilient supporting means comprising a spring carried under each end of each tube between said first slotted walls and said second slotted walls.

11. The structure of claim 8 in which there is a block of rubber-like material carried between said first walls, and upon which said tubes rest.

References Cited in the file of this patent
UNITED STATES PATENTS

| | | |
|---|---|---|
| 2,010,407 | Matthias | Aug. 6, 1935 |
| 2,612,700 | Frisk | Oct. 7, 1952 |
| 2,976,725 | Byer | Mar. 28, 1961 |